April 18, 1961  F. M. NASH  2,980,256
SWIMMING POOL FILTERING AND VACUUM CLEANING SYSTEM
Filed March 27, 1958  2 Sheets-Sheet 1
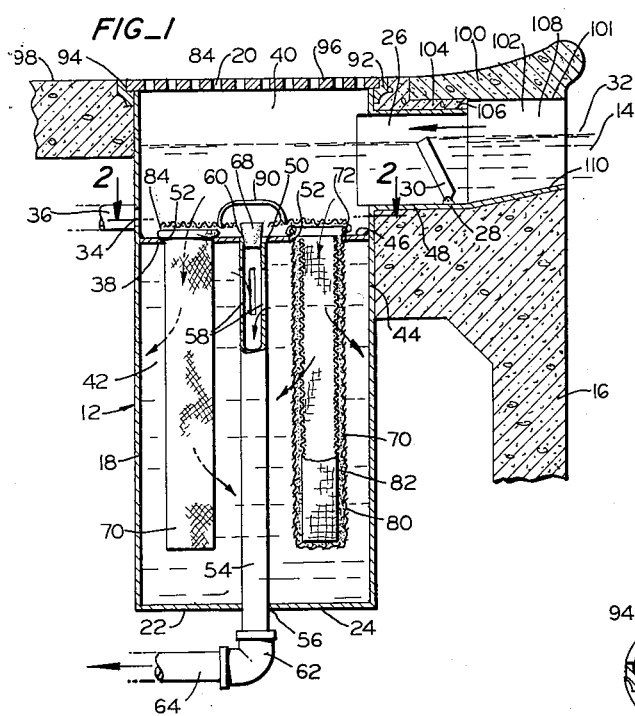
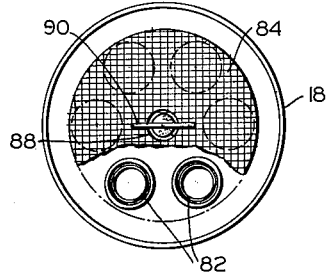
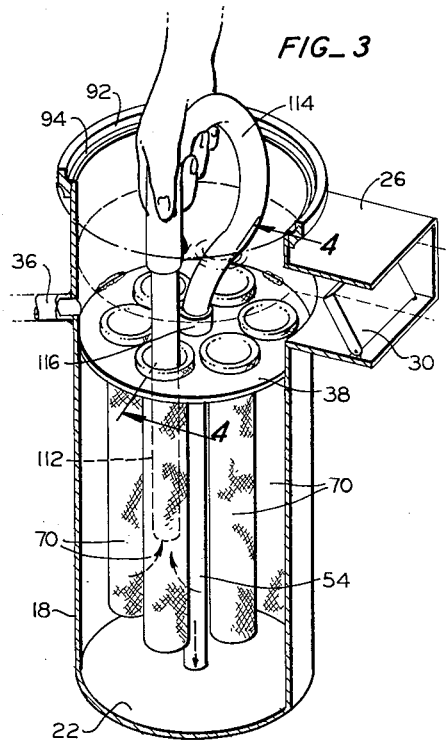
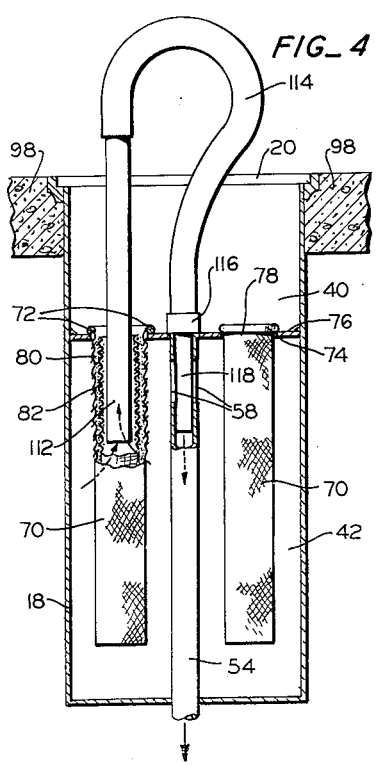
INVENTOR.
FLOYD M. NASH
BY Naylor + Neal
ATTORNEYS

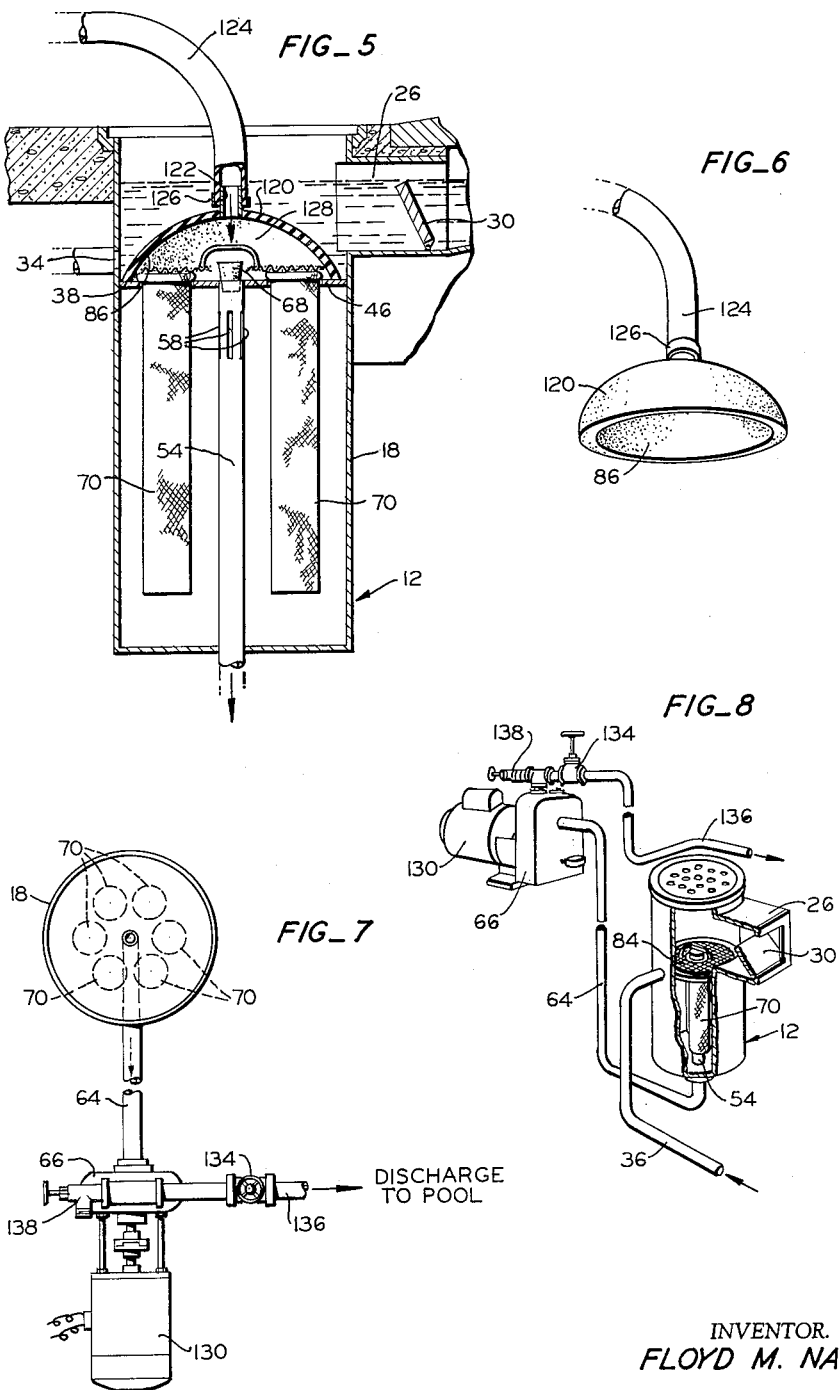

United States Patent Office 2,980,256
Patented Apr. 18, 1961

2,980,256

SWIMMING POOL FILTERING AND VACUUM CLEANING SYSTEM

Floyd M. Nash, Berkeley, Calif., assignor to Jacuzzi Bros., Inc., Richmond, Calif., a corportion of California Filed Mar. 27, 1958, Ser. No. 724,475

12 Claims. (Cl. 210—169)

This invention relates in general to fluid filtering systems and more particularly to a vacuum type fluid filtering system well suited for use with swimming pools.

It is an object of this invention to provide a thoroughly effective vacuum filtering system for fluids which is adapted for use with a filter element of capsular shape within which may be disposed a diatomaceous earth filtering medium for filtering fluid passing from the inside to the outside of the filter element through the walls thereof.

It is an object of this invention to provide a system of the character described which is adapted to utilize a plurality of easily removable filter elements constructed and disposed such that the filter elements share the filtering load, acting substantially independently of one another with filtering of the fluid being accomplished with a single passage through any one filter element.

It is another object of this invention to provide a thoroughly effective vacuum filtering system in which the possibility of filter element float-up is minimized.

Still another object is to provide a system of the character described utilizing a filter element which may be quickly and conveniently backwashed with a flow of backwashing fluid directed from the outside to the inside of the filtering element or elements being backwashed.

A further object is the provision of a system of the character described in which the backwashing is made particularly effective through production of a high rate of backwash fluid flow by utilization of substantially the entire force of the filter operating vacuum for the backwashing operation.

A still further object is the provision of a system of the character described which may be used for the vacuum cleaning of a pool without the necessity of installing a separate vacuum line therefor with flow during the vacuum cleaning operation being from the inside to the outside of the filter elements.

Other objects and advantages of this invention will become apparent from the following description taken in conjunction with the drawings forming part of this specification in which:

Figure 1 is a sectional view of the filter unit of this invention installed adjacent a swimming pool.

Figure 2 is a sectional view taken along the line 2—2 in Figure 1 showing the filter unit tank with the leaf strainer positioned therein, the strainer being partially broken away to illustrate the installation of typical filter elements therebelow.

Figure 3 is a perspective sectional view illustrating the means for accomplishing the backwashing of the filter elements.

Figure 4 is a sectional view taken along the line 4—4 of Figure 3 further illustrating the means for filter element backwashing.

Figures 5 and 6 illustrate the means for utilizing the system of this invention for the vacuum cleaning of a pool, Figure 6 illustrating in perspective the vacuum cleaning units which are shown in section in Figure 5.

Figure 7 is a top plan view of the filtering unit of this invention showing its connection to the pump means and to the return line to the pool.

Figure 8 is a partially broken away view in perspective of a typical filter unit installation of the invention.

In Figure 1 is shown the filter unit 12 installed adjacent swimming pool 14 and wall 16 thereof. The filter unit 12 is comprised of an upright cylindrical filter tank 18 open at its upper end 20 and closed at its lower end 22 by an end plate 24. Communicating with the upper portion of tank 18 is a rectangular intake duct 26 serving to admit fluid from the pool 14 to the tank 18 and having pivotally mounted therein upon its lower surface 28 a skimmer weir 30 to facilitate the drawing off of scum from the upper surface 32 of the pool 14. Fluid from the main pool drain is admitted to the tank through aperture 34 communicating with pipe 36 which is fastened to the tank to form a fluid tight joint therewith. A flat transverse plate 38 is disposed within the upper portion of tank 18 dividing the tank into an upper or outer chamber 40 and a lower or inner chamber 42. As indicated in Figure 1, plate 38 is disposed perpendicular to the side wall 44 of the tank 18 with its upper surface 46 slightly below the lower inside surface 48 of the intake duct 26. The plate 38 is soldered to tank wall 44 about its entire periphery to prevent passage of fluid between the plate 38 and the contiguous surface of the tank wall. Plate 38, as illustrated, is provided with a centrally disposed aperture 50 and six additional apertures 52 symmetrically disposed thereabout.

An upright suction pipe 54 is centrally disposed in the inner chamber 42 of tank 18, the lower end of the pipe projecting through and being secured to the end plate 24 and the upper end being secured within central aperture 50. The pipe 54 is soldered to end plate 24 at 56 to assure a fluid tight joint. Slots 58 are provided in the upper end of pipe 54 to permit direct passage of fluid from the inner chamber 42 to pipe 54. The position of the slots 58 at the upper end of pipe 54 permits withdrawal of fluid from the upper portion of chamber 42 without air separation and resultant filter element float-up.

Threaded to the lower extremity of pipe 54 is an elbow 62 which is in turn threaded to pipe 64, the latter being connected to the suction side of the pump 66 (Figures 7 and 8). A plug 68 of a resilient material, such as rubber, is provided for insertion and removal from the upper end 60 of the pipe 54. Plug 68 is normally positioned within the pipe 54 during the hereinafter described filtering and pool vacuum cleaning operations, serving thereby to block the direct flow of fluid into pipe 54 from the outer chamber 40 and effectively limiting flow into pipe 54 to that from inner chamber 42 through pipe slots 58.

Cylindrical or capsular shaped filter elements 70, open at their upper ends and closed at their lower ends, are suspended for easy removal in each of the apertures 52 of the plate 38 through use of oversize split rings 72 which serve as retaining flanges bearing upon the aperture defining edges 74 of upper surface 76 of plate 38. The filter elements 70 are composed of a durable permeable material, such as heavy canvas, and it has been found convenient to provide a hem at the upper edge of each of the filter elements 70 for enclosure therein of the split rings 72. The permeable material of the filter elements 70 has a surface receptive to retention thereon of a diatomaceous earth or similar filtering media which is poured in slurry form into the filter tank 18 from above prior to the start of filtering operation. The filter elements 70 are open at their upper ends 78 to permit direct passage of fluid thereinto from the outer chamber 40. As indicated in Figure 1, the fluid received from the outer chamber 40 for filtering by the elements 70 flows from inside the filter elements 70 through the permeable walls 80 thereof to the inner chamber 42, being filtered as it passes by the diatomaceous earth deposited upon substantially the entire inner surface of the element walls 80. Perforated hollow cylindrical reinforcing inserts 82 of rigid construction are removably fitted in each of the filter elements 70, being of outer diameter and length slightly less than the respective inner diameter and length of the filter elements. The inserts 82 thus provide rigid reinforcement for the filter elements substantially throughout their entire length serving to prevent collapse of the elements 70 when the filter unit 12 is undergoing backwashing which, as indicated in Figures 3 and 4, involves the flow of fluid from the inner chamber 42 through the permeable walls 80 of the filter elements 70, i.e., from the outside of the filter elements 70 to the inside thereof, a direction of flow opposite to that described above as occurring during the filtering operation.

In Figures 1 and 2 is shown a flat circular leaf screen 84 which rests atop the filter elements 70 preventing entry thereinto of leaves or similar debris drawn from the pool during the filtering and vacuum cleaning operations. The diameter of the screen 84 is sufficiently less than that of the plate 38 to permit the fitting thereover of a vacuum cover 86 which latter is supported as hereinafter described upon the outer periphery of surface 46 of plate 38. The screen 84 is provided with a central aperture 88 permitting projection therethrough of the plug 68 which, coacting with the aperture 88, serves to position the screen 84 centrally relative to plate 38. A handle 90 is provided for use in removing the screen 84 upwardly from the filter unit 12.

At its upper end the filter unit 12 is provided with an outwardly extending annular flange 92 having formed integral therewith an inner annular bearing surface 94 upon which latter rests, for easy removal, a flat circular perforated deck plate 96. The horizontal deck 98 adjacent swimming pool 14 encircles flange 92 and the upper end of filter unit 12. The deck 98 is stepped adjacent the pool for receipt of a coping block 100 which latter serves to define the upper boundary 101 of the passage 102 provided to communicate with duct 26 of the filter unit 12 in supplying fluid for skim-filtering thereto. A projection 104 of deck 98 extends between coping block 100 and the upper edge 106 of duct 26. The side walls 108 of passage 102 are disposed upright between the upper surface 101 and the lower surface 110 of the passage, being faced with a smooth material such as tile. The lower surface 110, similarly faced, is tapered downwardly in a direction away from the pool 14 and is disposed to mate with the lower inside surface 48 of duct 26 to form therewith a substantially continuous surface.

In Figures 3 and 4 is shown the filter unit 12 arranged for vacuum backwashing, i.e., filter element cleaning, with the plate 96, screen 84, and plug 68 removed. The hollow cylindrical probe 112 is connected at its upper end to a length of flexible hose 114 in turn secured through connecting collar 116 to a cylindrical tube 118. In addition to serving as a connector, collar 116 serves to limit the extent of insertion of the tube 118 into the central aperture 50 of plate 38, through engaging the upper surface 46 of the plate. The tube 118 is of a diameter and length which permit its insertion into pipe 54 in close fitting relationship therewith such that said tube when inserted, as in Figure 4, effects a closure of pipe slots 58, blocking direct flow from inner chamber 42 to pipe 54. The probe 112, as shown in Figure 4, is of a diameter and length permitting its easy insertion within the cylindrical inserts 82 of any of the filter elements 70. By closing off the slots 58 in the upper end of pipe 54 by insertion therein of tube 118, the suction force of the pump 66 is concentrated in the tube 118 and attached hose 114 and probe 112. Thus, a suction force considerably greater than that normally applied to the filter elements 70 as a group during the filtering operation, may be selectively applied through probe 112 to the individual filter elements for backwashing purposes.

In Figure 5 the filter unit 12 is shown arranged for vacuum cleaning of the pool 14. Deck plate 96 is removed and dish-shaped cover 86, the outer diameter of which is slightly less than the inner diameter of the cylindrical filter tank 18, is positioned atop plate 38 thereby blocking the normal filter flow of fluid from duct 26 and inlet 34 through screen 84 into the filter elements 70. Centrally disposed and projecting upwardly from the upper surface 120 of the cover 86 is a sleeve 122 over which is fitted a vacuum cleaner hose 124 secured in place by a clamp 126. Plug 68 is inserted in pipe 54 forcing the vacuum cleaner effluent to pass through hose 124 into the cavity 128 beneath cover 86 to flow through the leaf screen 84 and the filter element 70 in the same direction and with the same cleaning and filtering effects as in the cases of fluid supplied by duct 26 and pipe 36 for the normal filtering operation.

In Figures 7 and 8, the pump 66 driven by motor 130 is shown connected to filter unit 12 through suction line 64 and pipe 54 connected thereto, with the path of discharge to the pool 14 being through return line shut-off valve 134 and return line 136 as indicated. For purposes of backwashing, the return line shut-off valve 134 is closed and the bib valve 138 opened to pass the backwash flow to waste.

In preparing for the filtering operation, the motor 130 and the pump 66 are started, and with operating vacuum on the line 64, a slurry of diatomaceous earth or similar filtering media is poured into the outer chamber 40 to be drawn by suction pipe 54, connected to line 64, into the filter elements 70 to coat substantially the entire inner surfaces thereof with a layer of such media. Fluid from the top and bottom of the pool 14 is fed through duct 26 and inlet 34, respectively, into outer chamber 40 from which it is drawn downward through screen 84 to be distributed between the filtering elements 70. With entry into the filter elements 70 and the inserts 82 carried therein, the fluid is drawn therethrough into the inner chamber 42 being filtered as it passes through the permeable walls of the filter elements and the filtering media deposited thereon. It should here be noted that filtering of the fluid is complete with a single passage through any one element, successive passage through any of the other filter elements not being required. The plug 68, inserted at the upper end of pipe 54, prevents the fluid from by-passing the filtering elements 70 by preventing flow of fluid thereinto from the outer chamber 40. The fluid is drawn from the upper portion of the inner chamber 42 into pipe 54 through the slots 58 to be returned to the pool through line 64, pump 66, valve 134 and return line 136.

It should be noted that the manner of suspending the filter elements 70 from plate 38 permits their easy removal for manual cleaning if desired. The elements can be individually lifted from their positions in the plate after removal of the deck plate 96 and the leaf screen 84 from its resting place upon the upper ends of the elements 70.

An important aspect of the described filter system is the direction of filter flow with respect to the filter elements 70, i.e. from the inside to the outside of said elements. For one thing, the diatomite filter material is located on the inside surfaces of the filter bags, and hence it is not possible for this material to flake or drop off of the bags into the filter tank. This is a problem of concern where the filter material is on the outside of such bags or carriers and filter flow is from the outside thereof to the inside. Also, with the multiple filter elements arrangement and the filter flow direction with respect thereto, a more efficient backwashing operation is possible, since the pump during backwashing acts on one filter element at a time. With a pump of normal capacity for a filter system of this type, the maximum filtering rate may be approximately 3 gallons per square foot of filtering surface, while backwashing may take place at a rate of fifteen gallons per square foot.

Another important aspect of the described filter system is the location of the ports 58 in pipe 54 adjacent the upper end of the latter. With the system open to atmosphere, as shown, a water-air mixture is drawn into the lower chamber 42 of the tank. The air bubbles tend to move toward the top of the chamber, i.e. the water-air mixture tends to become richer in air at the upper end of the chamber and leaner in air at the lower end. By removing the richer in air mixture, by virtue of the location of ports 58, an accumulation of air within the chamber is prevented. If, for example, the ports 58 were located at the lower end of the chamber, i.e. if the leaner in air mixture were removed, the chamber would eventually become filled with air alone. This would not only starve the pump, but if the tank 12 is surrounded by water, a usual situation in practice, the build-up of air renders the tank buoyant, tending to "float-up" the tank and, in turn, to rupture the bond between the tank and the grout normally employed to hold it in place.

It will be appreciated that the deck plate 96 may be replaced with a filter tank closure of the pressure sealing type to enable (1) the filter tank to be connected to the pressure, rather than the suction, side of the pump or (2) the conversion of the filter unit to a closed system while maintaining it at the suction side of the pump. In the case of the latter-mentioned closed system, it will be appreciated that the weir-gate tunnel would not be in communication with the upper filter tank chamber 40 but that instead, for example, the chamber 40 would receive water from a pipe which communicates with the body of the pool water below the level thereof.

While I have shown and described in detail one specific embodiment of the invention, it will be apparent that such embodiment may be modified to a considerable extent without departing from the scope of the appended claims.

What is claimed is:

1. A vacuum system comprising in combination, a tank having an inner and an outer chamber, intake means for supplying fluid to the outer chamber of the tank, vacuum effecting means communicating with the inner and outer chambers of the tank, filter means having a plurality of elongated filter elements of permeable material communicating with the outer chamber, fluid during the filtering operation flowing from the outer chamber of the tank to the various filter elements to be filtered by passing once through any one filter element in a direction from the inside to the outside thereof, and backwashing means connected to the vacuum effecting means and being received within one of said filter elements to thereby effect a backwashing fluid flow through said elements in a direction from the outside to the inside thereof.

2. The system of claim 1 wherein the backwashing means may be selectively connected to each of said individual filter elements to effect a concentration of the suction of the vacuum effecting means such that a relatively high rate of backwashing fluid flow is effected through said individual filter elements.

3. A vacuum system comprising in combination, a tank, a plate disposed transversely in the tank having apertures therein and dividing the tank into an inner and outer chamber, intake means for supplying fluid to the outer chamber of the tank, suction means including an elongated pipe having openings to place it in direct communication with the upper and lower chambers of the tank, filter means having a plurality of elongated filter elements with outwardly flanged open ends communicating with the outer chamber, the filter elements being suspended in the apertures of the plate through engagement of their flanged open ends with the plate, filtering being accomplished by the flow of fluid through the filter elements in a direction from the inside to the outside thereof, backwashing means comprising a flexible hose connected at one end to a probe and at the other end to a tube, the probe being inserted into one of the filter elements and the tube being inserted into the elongated pipe of the suction means to close said openings and prevent direct communication between the pipe and both the inner and outer chambers of the tank, the backwashing of the individual filter elements being accomplished while the tube is so inserted in the pipe through successive insertion of the probe into the substantially open ends of the individual filter elements, a backwashing fluid flow thereby being effected through the particular filter element being backwashed in a direction from the outside to the inside thereof.

4. The system of claim 3 wherein the filter elements have walls of permeable material and carry therein means for reinforcing the elements against collapse during the backwashing thereof.

5. The system of claim 4, wherein the outwardly flanged open ends of said filter elements comprise oversized split rings, said filter elements thereby being subject to easy withdrawal from their suspended positions in the apertures of the plate.

6. A filter system for the filtering of fluid comprising a tank and partition means dividing said tank into upper and lower chambers, fluid inlet means communicating with said upper chamber, a pump having a suction inlet and a pressure outlet, conduit means connecting said lower chamber to the suction inlet of said pump, said conduit means including a pipe extending through the partition means to communicate with the upper chamber, at least one inlet port formed in said pipe below said partition means and adjacent thereto, a removable closure for the end of said pipe extending through said partition means, at least one flow passageway formed through said partition means, and filter means connected to said partition means adapted to filter the fluid passed through said passageway from said upper chamber into said lower chamber.

7. The system of claim 6, wherein a plurality of flow passageways are formed through said partition means, each of said passageways having separate filter means.

8. In a filter system for the filtering of fluid, the subcombination comprising a tank, a partition plate extending transversely of said tank and dividing the same into upper and lower chambers, a fluid inlet communicating with the upper chamber, a conduit extending longitudinally through said lower chamber and said partition plate and having an open end communicating with said upper chamber, at least one opening formed in said conduit below said partition plate and communicating with said lower chamber, and at least one opening formed through said plate in offset relation to said conduit for the reception of a filter element to be suspended from said plate and disposed within said lower chamber, the outlet means from said tank comprising said conduit.

9. The sub-combination of claim 8 including removable plug means disposable within the end of said conduit to interrupt direct communication between said conduit and said upper chamber.

10. The sub-combination of claim 8 including backwashing means for said filter element comprising a pump connected to the outlet end of said conduit, and a tubular open-ended probe, one end of which is tightly fitted into the open end of said conduit to close off communication between said conduit and said inner chamber, and the other end of which is inserted within said filter element.

11. In a filter system for the filtering of fluid, the combination comprising a tank, a partition plate extending transversely of said tank and dividing the same into upper and lower chambers, a fluid inlet communicating with the upper chamber, a conduit connected to the lower chamber of said tank in flow receiving relation therewith, a plurality of openings formed through said plate, an open-mouthed filter bag depending into said lower chamber through each of said plate openings whereby filter flow from said upper chamber to said lower chamber takes place from the inside to the outside of said bags, a pump having its suction side connected to said conduit, and means for selectively inducing fluid flow from the outside to the inside of any one of said bags to thereby backwash the same, said means comprising a tubular connector, one end of which is connected to said conduit to interrupt communication between said lower chamber and said conduit and the other end of which is removably inserted through the open mouth of the bag to be backwashed.

12. The combination of claim 11 including removable, rigid, porous inserts disposed within said bags to prevent the collapse of said bags during the backwashing thereof.

References Cited in the file of this patent

UNITED STATES PATENTS

| | | |
|---|---|---|
| 109,467 | Strauss | Nov. 22, 1870 |
| 203,714 | Donner | May 14, 1878 |
| 779,013 | Wahnsiedler | Jan. 3, 1905 |
| 1,223,299 | Taylor | Apr. 17, 1917 |
| 1,284,944 | St. Pierre | Nov. 12, 1918 |
| 1,404,667 | Stevens | Jan. 24, 1922 |
| 1,877,157 | Cannon | Sept. 13, 1932 |
| 2,701,235 | King | Feb. 1, 1955 |
| 2,733,815 | Kwochka et al. | Feb. 7, 1956 |
| 2,792,943 | Mackintosh | May 21, 1957 |
| 2,800,232 | Marvel | July 23, 1957 |
| 2,826,307 | Pace | Mar. 11, 1958 |
| 2,844,255 | Cavenah et al. | July 22, 1958 |
| 2,872,043 | Fitzgerald et al. | Feb. 3, 1959 |
| 2,874,845 | Fain et al. | Feb. 24, 1959 |

FOREIGN PATENTS

| | | |
|---|---|---|
| 348,794 | Great Britain | May 21, 1931 |